United States Patent [19]
Herington

[11] Patent Number: 5,546,226
[45] Date of Patent: Aug. 13, 1996

[54] THREE DIMENSIONAL PATTERN DEVICE USED WITH LIGHT PROJECTOR

[76] Inventor: Charles E. Herington, 3890 S. Skyline Dr., Evergreen, Colo. 80439

[21] Appl. No.: 418,455

[22] Filed: Apr. 7, 1995

[51] Int. Cl.⁶ ................................................ G02B 27/08
[52] U.S. Cl. .......................................... 359/616; 359/617
[58] Field of Search ...................................... 359/616, 617

[56] References Cited

U.S. PATENT DOCUMENTS

| | | | |
|---|---|---|---|
| 3,383,150 | 5/1968 | Powers | 359/616 |
| 4,205,893 | 6/1980 | Taylor | 359/616 |

*Primary Examiner*—Michael L. Gellner
*Assistant Examiner*—Daniel P. Malley
*Attorney, Agent, or Firm*—Edwin H. Crabtree; Donald W. Margolis; Ramon L. Pizarro

[57] ABSTRACT

A universally rotatable sphere used with a light projector. The sphere may be transparent, semi-transparent or translucent for passing light therethrough from a light source disposed next to the sphere. Also, the sphere may include images and patterns of different colors on the surface of the sphere or imbedded inside the sphere. The images and patterns may also be transparent, semi-transparent, translucent or opaque. The system may use the rotatable sphere by itself with the light source or in conjunction with a longitudinal conduit having at least two longitudinal reflective surfaces positioned inside the conduit forming a light path. The conduit includes an entrance end and exit end and is used for producing kaleidoscopic images from light entering the entrance end and reflecting off the reflective surfaces. The sphere is placed next to the entrance end of the longitudinal conduit to allow light from a light source to first be passed therethrough. The light is then converted into kaleidoscopic images inside the longitudinal reflective conduit to allow projection and viewing of the images as they are reflected. Friction wheels are connected to motor drives disposed next to the entrance of the conduit. The friction wheels are used to engage and rotate the sphere in a universal, three dimensional manner and thus allow the system to produce moving kaleidoscopic projections. While the reflective conduit is described also different types and shapes of prisms could be used equally well for producing kaleidoscopic projections.

14 Claims, 2 Drawing Sheets

5,546,226

1
THREE DIMENSIONAL PATTERN DEVICE USED WITH LIGHT PROJECTOR

BACKGROUND OF THE INVENTION (a) Field of the Invention

This invention relates to a light projection system and more particularly, but not by way of limitation, to a light projection system using a universally rotatable sphere for producing constantly changing images. The images may also be passed through a conduit for creating kaleidoscopic images.

(b) Discussion of Prior Art

Heretofore there have been a variety of different types of inventions dealing with light projected on and reflected by rotating devices. In U.S. Pat. Nos. 4,386,916 to Beal, 3,634,679 to Krzyston, 1,014,958 to Edison and 2,867,716 to Ream, light is directed onto a rotating reflector. The reflector in turn directs light designs outward onto a screen, wall, etc. Also, U.S. Pat. Nos. 4,250,537 to Roegner et al., 3,755,664 to Reiback and 3,760,176 to Trop describe different types of light machines for refracting and reflecting light.

In U.S. Pat. No. 3,119,565 to Nottingham an illuminating device is described having a motor driven multi-faceted crystal ball rotated between a light source and a convex lens. The device, using refractive light from the crystal ball, produces a kaleidoscopic design on a wall or ceiling.

None of above mentioned patents have the combination of different features of the subject invention nor do they incorporate the unique combination of structure and function of the subject kaleidoscopic light projection system using a multi-colored and patterned sphere as described herein.

SUMMARY OF THE INVENTION

In view of the foregoing, it is a primary object of the invention to provide an illumination system that will allow the lighting system user to project a desired multi-colored image, logo, pattern and the like using a universally rotatable sphere.

Another object of the projection system is the use of a universally rotatable sphere rotated in a predetermined sequence so that projectable images within the rotatable sphere may be projected on to a desired surface and then the image may be caused to vanish, animate, dissolve into another image and return by rotating the sphere. The sphere is driven by a pair of motors with friction wheels for moving the sphere in three dimensions. The motors may be under computer control.

Still another object of the invention is to provide a kaleidoscopic projection system used with a standard lighting system to produce unusual and varied kaleidoscopic patterns on a projected surface.

Yet another object of the invention is to provide a kaleidoscopic projection system that includes the continuously rotatable sphere that serves as an image source and as a light filter.

Another object of the invention is the projection system may be installed in existing lighting systems as a retrofit unit or incorporated into new lighting system fixtures. The rotatable sphere is interchangeable with other spheres for providing different images, patterns, colors, etc. as used in conjunction with the longitudinal conduit or the sphere with a light source can be used as a stand alone light system independent of the conduit.

The light projection system includes universally rotatable sphere. The sphere may be transparent, semi-transparent or translucent for passing light therethrough from a light source disposed next to the sphere. Also, the sphere may include images and patterns of different colors on the surface of the sphere or imbedded inside the sphere. The images and patterns may also be transparent, semi-transparent, translucent or opaque. The system may use the rotatable sphere by itself with the light source or in conjunction with a longitudinal conduit having at least two longitudinal reflective surfaces positioned inside the conduit forming a light path. The conduit includes an entrance end and exit end and is used for producing kaleidoscopic images from light entering the entrance end and reflecting off the reflective surfaces. The sphere is placed next to the entrance end of the longitudinal conduit to allow light from a light source to first be passed therethrough. The light is then converted into kaleidoscopic images inside the longitudinal reflective conduit to allow projection and viewing of the images as they are reflected. Friction wheels are connected to motor drives disposed next to the entrance of the conduit. The friction wheels are used to engage and rotate the sphere in a universal, three dimensional manner and thus allow the system to produce moving kaleidoscopic projections. While the reflective conduit is described also different types and shapes of prisms could be used equally well for producing kaleidoscopic projections. Also, the friction wheels can be used to engage and rotate the sphere independently of the reflective conduit or prisms.

These and other objects of the present invention will become apparent to those familiar with light projection systems from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
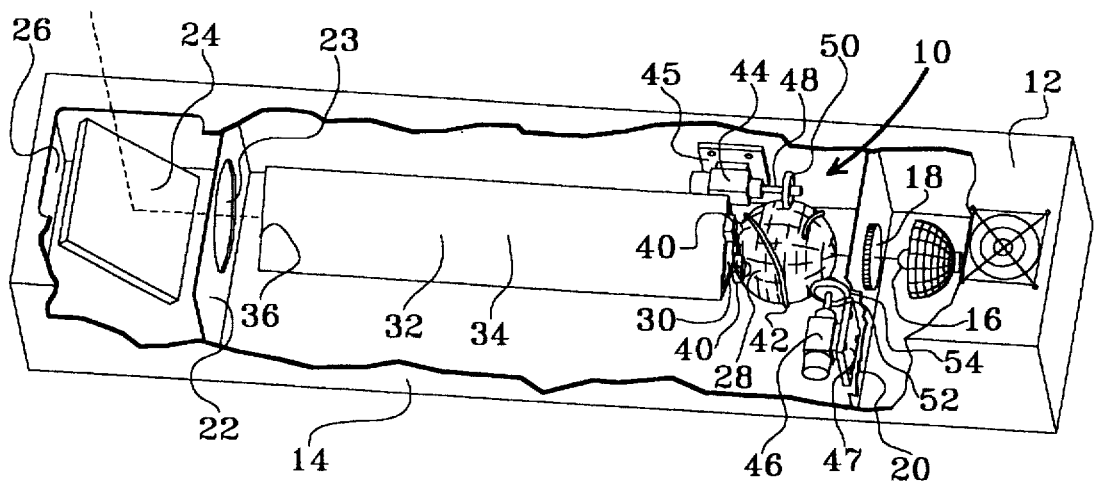
FIG. 1 is a perspective view of the subject kaleidoscopic light projection system wherein a light housing has been cut away to expose a light source and the sphere disposed in front of a longitudinal conduit used for creating kaleidoscopic images.

In FIG. 1, a perspective view of the subject kaleidoscopic light projection system is shown having a general reference numeral 10. The system 10 is seen installed inside a housing 12 of a lighting unit 14. The lighting unit 14 includes a high intensity light source 16 with light reflector 17, an infrared heat filter 18 mounted on a light panel 20 disposed in front of the light source 16, a light exit panel 22 with opening 23 and a reflective mirror 24 for projecting the light outwardly from an opening 26 in the top of the housing 12. It should be kept in mind that the lighting unit 14 with light source 16 can have a variety of configurations in reflecting light outwardly at an angle from the housing 12 depending on the light being projected on a screen, a wall, a ceiling, etc. Also the system 10 can be used in conjunction with other types of lighting fixtures and with or without reflective mirrors.

Figure 4:
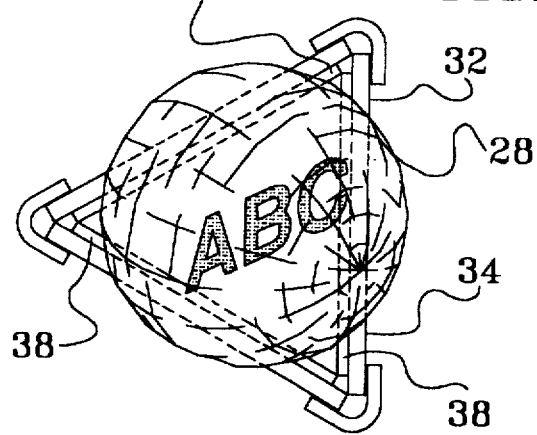
FIG. 4 is an end view of a cross section of the sphere having a logo embedded therein with the entrance of the conduit disposed behind the sphere.
Figure 5:
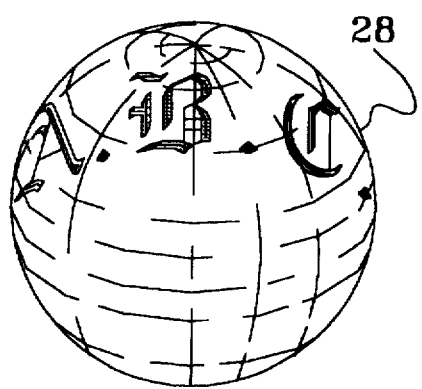
FIG. 5 and 6 are perspective views of two different spheres having colored patterns and logos thereon or therein.
Figure 6:
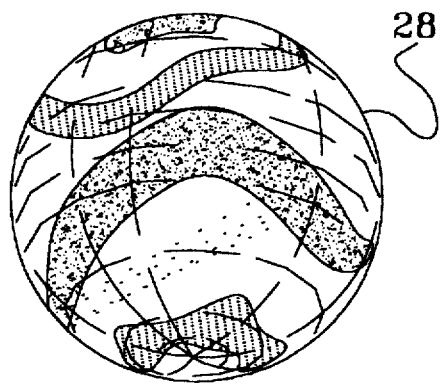

The subject system 10 includes a universally rotatable a sphere 28 having various patterns, colors, business logos and other embedded images therein as shown in FIGS. 4–6. The sphere 28 may be transparent, semi-transparent or translucent for passing light therethrough from a light source 16 disposed next to the sphere 28. Also, the sphere 28 may include images and patterns of different colors on the surface of the sphere or imbedded inside the sphere. The images and patterns may also be transparent, semi-transparent, translucent or opaque.

The sphere 28 is disposed in front of an entrance end 30 of a longitudinal conduit 32. The conduit 32 includes a conduit housing 34, an exit end 36 and longitudinal reflective surfaces 38 disposed inside the housing 34. A triangular configuration of the conduit 32 is shown in the drawings. It can be appreciated that at least two reflective surfaces along with any additional number of reflective surfaces may be used together inside the conduit 32 for creating kaleidoscopic images. Three reflective surfaces 38 are shown in FIG. 4.

Figure 2:
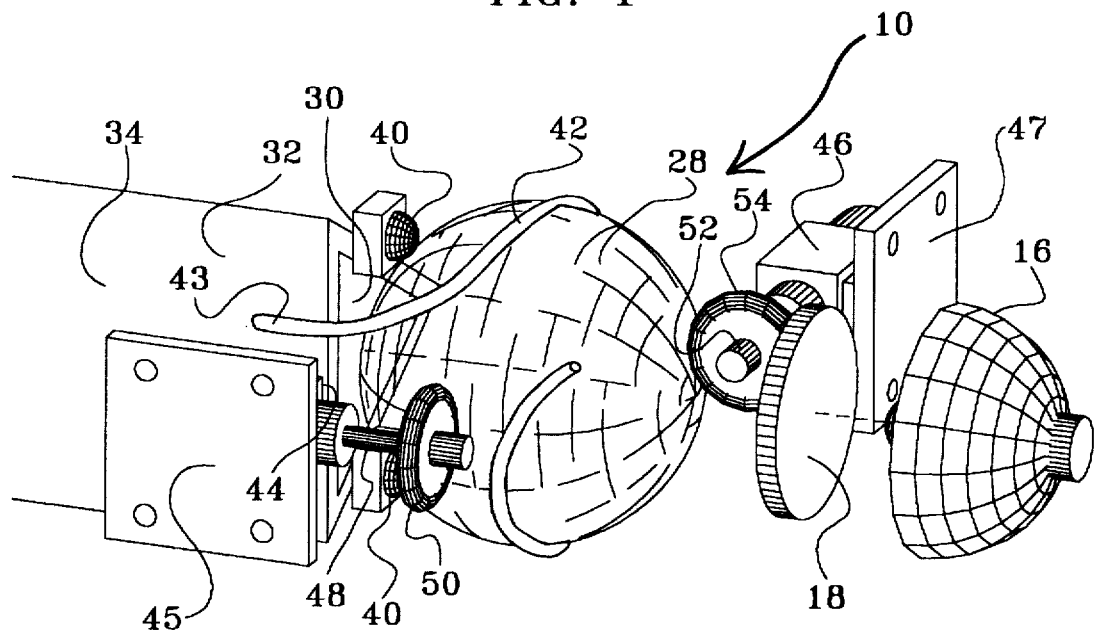
FIG. 2 is an enlarged perspective view of the light source, the sphere and drive motors and friction wheels for rotating the sphere in three dimensions.

Referring now to both FIGS. 1 and 2, the sphere 28 is held in front of the entrance end 30 against rotatable bearings 40 mounted on the housing 34. The bearings 40 may be in the form of ball bearings, needle bearings, roller bearings and the like. The sphere 28 is held in place using a metal retaining spring 42 wrapped around a portion of the sphere 28 with an end 43 of the spring 42 secured to the housing 34. The spring 42 by design allows for quickly removing the sphere 28 and replacing it with a different sphere 28 with different pattern, color, logo, etc.

The sphere 28 is rotated using a first drive motor 44 with mounting plate 45 attached to the housing 12 and a second drive motor 46 with mounting plate 47 attached to the light panel 20. The first drive motor 44 includes a drive shaft 48 with friction wheel 50. The friction wheel 50 engages a portion of the sphere 28 and moves the sphere in a X and Y plane. The second drive motor 46 includes a drive shaft 52 with friction wheel 54. The friction wheel 54 engages a portion of the sphere 28 and moves the sphere in a X and Z plane. Using the two drive motors 44 and 46, which may be under computer control, the sphere 28 is moved universally or in three dimensions for moving an image or pattern in a variety of ways such as fading an image in and out of view, rolling or tumbling a pattern or logo, moving different colors in and out of view, etc. The motors 44 and 46 maybe bi-directional stepper motors and may be attached to different parts of the housing 12. Also, as mentioned above the sphere 28 with motors 44 and 46 may be used independently of the conduit 32.

Figure 3:
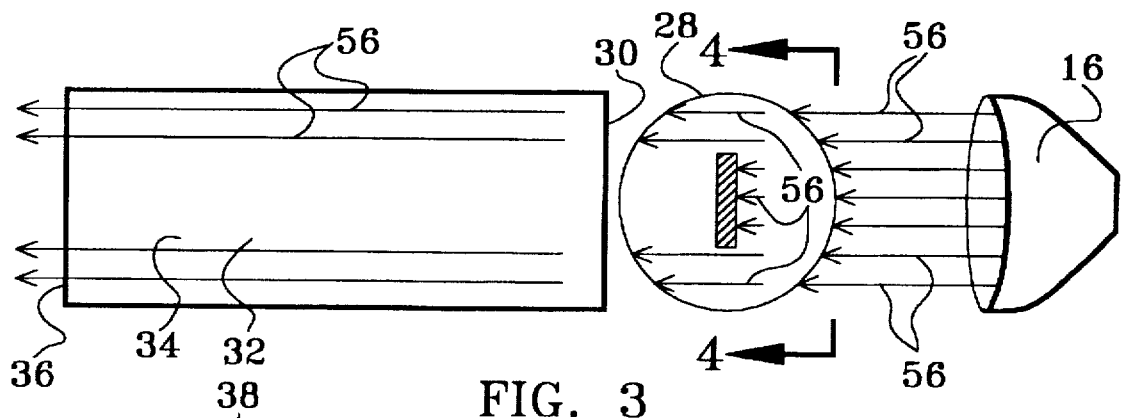
FIG. 3 is a side view of the light source with light rays shown reflected through the sphere with logo embedded therein and onto the reflective surfaces of the longitudinal conduit.

FIG. 3 illustrates a side view of the system 10 wherein light rays as indicated by arrows 56, emanating from the light source 16, pass through the sphere 28. The light rays 56 pick up an embedded colored pattern or image therein and the pattern or image is then passed inside the longitudinal conduit 32 where the light rays 56 are reflected off the reflective surfaces 38 creating a kaleidoscopic projection when the light leaves the exit end 36.

In FIG. 4 an sectional end view of the sphere 28 is illustrated taken along lines 4–4 shown in FIG. 3. In this view the sphere 28 includes a logo "ABC" embedded therein. Obviously, through the use of the motors 44 and 46 the sphere 28 can be manipulated by rolling, rotating and tumbling when projecting the logo "ABC" on a screen in a variety of ways for fascinating a viewing audience and drawing attention to the logo.

Figure 7:
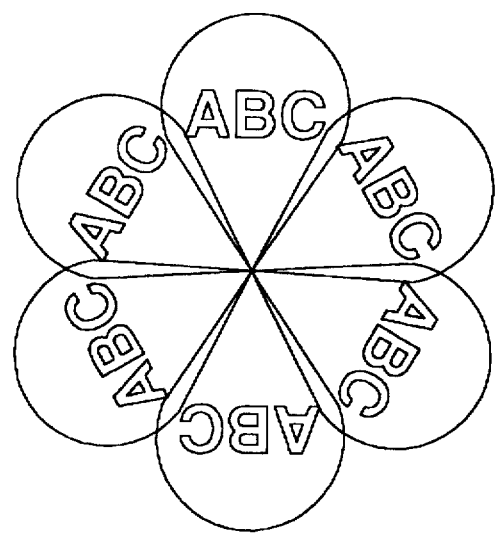
FIG. 7 illustrates an example of a kaleidoscopic pattern with logo projected by the subject invention.

FIG. 5 illustrates the sphere 28 with a logo "ABC" in a different script as shown in FIG. 4. FIG. 6 illustrates the sphere 28 with a colored and multi-colored pattern therein. The pattern may be in numerous forms and shapes for enhanced eye appeal. The patterns, images, logos, wording, etc. may take on different forms and embedded throughout the interior of the sphere 28 along with being on the surface of the sphere 28. FIG. 7 illustrates the kaleidoscopic pattern produced from the system 10 showing the logo "ABC" which is projected from the lighting unit 14.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A light projection system disposed next to a light source for projecting light images having kaleidoscopic images, the system comprising:

spherical means for receiving light from the light source therethrough; and means for producing kaleidoscopic images, said means for producing kaleidoscopic images having a light entrance end and a light exit end, said spherical means being disposed next to the light entrance end so that light directed through said spherical means is passed into said means for producing kaleidoscopic images, whereby kaleidoscopic projections are produced from said means for producing kaleidoscopic images when leaving the light exit end; and support means for retaining said spherical means thereon and rotation means for rotating said spherical means in a universal manner in front of the light entrance end of said means for producing kaleidoscopic images.

2. The system as described in claim 1 wherein said spherical means is a sphere, said sphere maybe transparent, semi-transparent and translucent for passing light therethrough from the light source disposed next to said sphere.

3. The system as described in claim 1 wherein said spherical means is a sphere, said sphere include images and patterns of different colors on the surface of said sphere and imbedded inside said sphere, the images and patterns may also be transparent, semi-transparent, translucent and opaque.

4. The system as described in claim 1 wherein said means for producing kaleidoscopic images comprises a conduit having at least two longitudinal planar reflective surfaces.

5. A light projection system disposed next to a light source for projecting light images having kaleidoscopic images, the system comprising:

a sphere for receiving light from the light source therethrough;

means for producing kaleidoscopic images, said means for producing kaleidoscopic images having a light entrance end and a light exit end, said sphere disposed next to the light entrance end so that light directed through said sphere is passed into said means for producing kaleidoscopic images, whereby kaleidoscopic projections are produced from said means for producing kaleidoscopic images when leaving the light exit end; and support means for retaining said sphere thereon and rotation means for rotating said sphere in a universal manner in front of the light entrance end of said means for producing kaleidoscopic images.

6. The light projection system as described in claim 5 wherein said rotation means comprises a first motor for rotating said sphere about a first axis and a second motor for rotating said sphere about a second axis.

7. The light projection system as described in claim 6 wherein said first motor and said second motor are under computer control for rotating said sphere universally in a three dimensional manner.

8. The light projection system as described in claim 7 wherein said first motor includes a drive shaft with first friction wheel, the first friction wheel engages a portion of said sphere and moves said sphere in a X and Y plane, said second motor includes a drive shaft with second friction wheel, the second friction wheel engages a portion of said sphere and moves the sphere in a X and Z plane.

9. A light projection system disposed next to a light source for projecting light images from a light source housing, the system comprising:

a sphere disposed in front of the light source and receiving light from the light source therethrough;

support means attached to the light housing for holding and retaining said sphere thereon; and rotation means attached to the light housing for rotating said sphere in a universal manner in front of the light source.

10. The system as described in claim 9 wherein said sphere is transparent, semi-transparent and translucent for passing light therethrough from the light source disposed next to said sphere.

11. The system as described in claim 10 wherein said sphere includes images and patterns of different colors on the surface of said sphere and imbedded inside said sphere, the images and patterns may also be transparent, semi-transparent, translucent and opaque.

12. The light projection system as described in claim 11 wherein said rotation means comprises a first motor for rotating said sphere about a first axis and a second motor for rotating said sphere about a second axis.

13. The light projection system as described in claim 12 wherein said first motor and said second motor are under computer control for rotating said sphere universally in a three dimensional manner.

14. The light projection system as described in claim 13 wherein said first drive motor includes a drive shaft with first friction wheel, the first friction wheel engages a portion of said sphere and moves said sphere in a X and Y plane, said second drive motor includes a drive shaft with second friction wheel, the second friction wheel engages a portion of said sphere and moves the sphere in a X and Z plane.

* * * * *